United States Patent [19]
Ono

[11] Patent Number: 5,841,582
[45] Date of Patent: Nov. 24, 1998

[54] ZOOM LENS OPTICAL SYSTEM

[75] Inventor: Kuniaki Ono, Saitama-ken, Japan

[73] Assignee: Fugi Photo Optical Co., Ltd., Saitama-ken, Japan

[21] Appl. No.: 26,504

[22] Filed: Mar. 4, 1993

[30] Foreign Application Priority Data

Mar. 27, 1992 [JP] Japan .................................. 4-070863

[51] Int. Cl.$^6$ .................................................. G02B 15/14
[52] U.S. Cl. ........................................ 359/688; 359/775
[58] Field of Search .................... 359/688, 775, 359/686, 676

[56] References Cited

U.S. PATENT DOCUMENTS

| | | | |
|---|---|---|---|
| 4,240,697 | 12/1980 | Takano | 359/686 X |
| 4,765,722 | 8/1988 | Aono | 359/688 |
| 5,146,366 | 9/1992 | Mukaiya | 359/688 |
| 5,204,779 | 4/1993 | Nakata | 359/688 |

FOREIGN PATENT DOCUMENTS

| | | | |
|---|---|---|---|
| 62-73222 | 3/1987 | Japan . | |
| 1-142519 | 5/1989 | Japan . | |
| 2226216 | 7/1990 | Japan | 359/688 |
| 2-287414 | 10/1990 | Japan . | |
| 4342217 | 10/1992 | Japan | 359/688 |

*Primary Examiner*—Son Mai
*Attorney, Agent, or Firm*—Baker & Botts, L.L.P.

[57] ABSTRACT

A zoom lens optical system has a first-lens set having a positive refracting power, a second-lens set having a negative refracting power, a third-lens set having a negative refracting power, a fourth-lens set having a positive refracting power, and an optical path splitter means. The first through fourth-lens set and the optical path splitter means are located in this order from the side of a plane of image formation. The zoom lens optical system satisfies the conditions $$1.2\, fw < f1 < 2.4\, fw, \text{ and}$$

$$0.4\, fw < f3/f2 < 0.8\, fw$$

where fw is a number equal to the minimum focal length of the whole system in millimeters, f1 is a number equal to the composite focal length of the first-lens set in millimeters, f2 represents the composite focal length of the second-lens set in millimeters, and f3 represents the composite focal length of the third-lens set in millimeters.

5 Claims, 5 Drawing Sheets

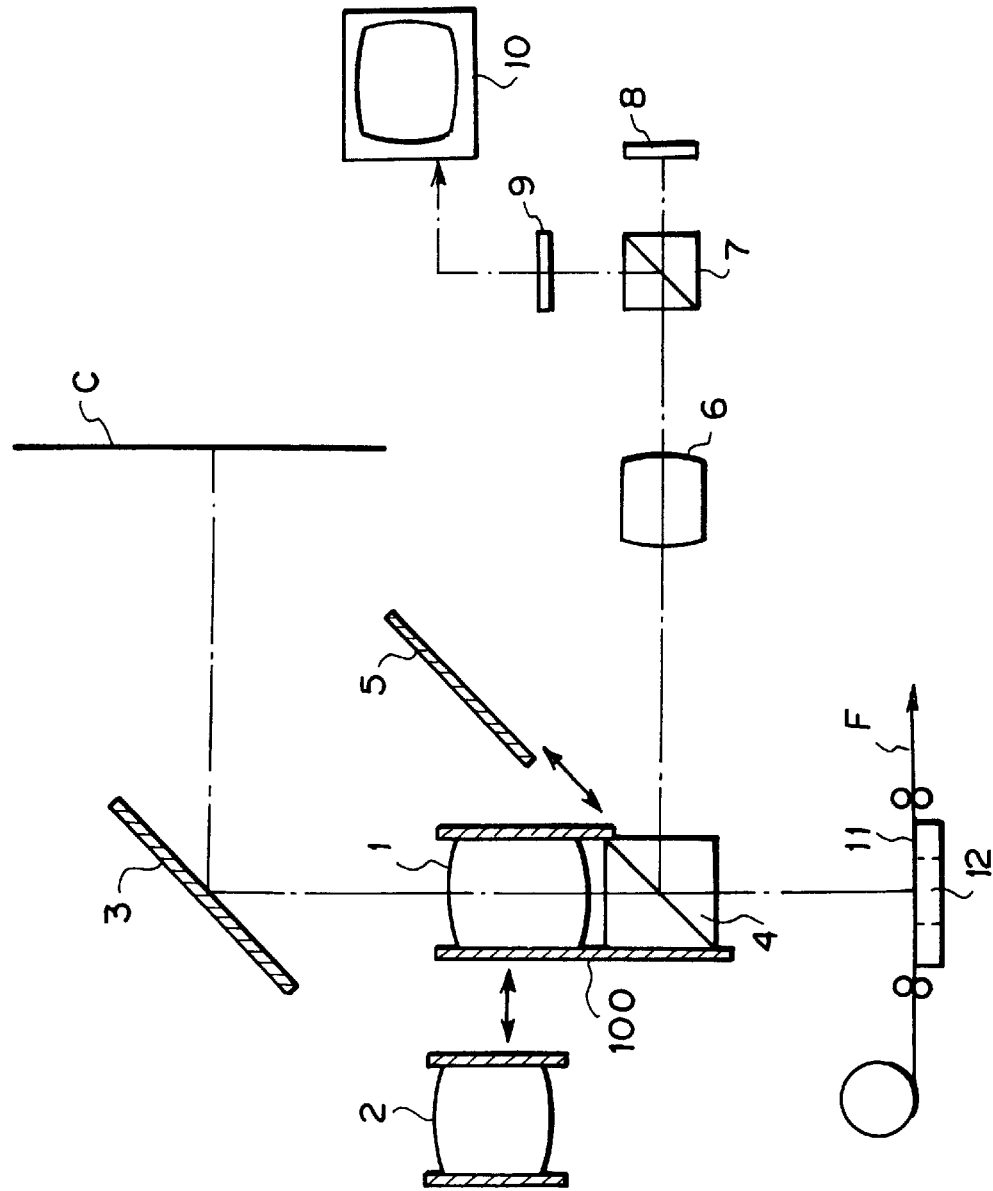

SPHERICAL ABERRATION

M=-1/14.00  F/6.2

-0.2  0.2 (mm)

ASTIGMATISM

Y=6.72

-0.2  0.2 (mm)

DISTORTION

Y=6.72

-1.0  1.0 (%)

M=-1/6.66  F/6.9

-0.2  0.2 (mm)

Y=21.4

-0.2  0.2 (mm)

Y=21.4

-1.0  1.0 (%)

M=-1/3.00  F/8.0

-0.2  0.2 (mm)

Y=21.4

-0.2  0.2 (mm)

Y=21.4

-1.0  1.0 (%)

SPHERICAL ABERRATION
M=-1/14.00   F/6.2

-0.2   0.2 (mm)

ASTIGMATISM
Y= 6.72

-0.2   0.2 (mm)

DISTORTION
Y= 6.72

-1.0   1.0 (%)

M=-1/6.66   F/6.9

-0.2   0.2 (mm)

Y=21.4

-0.2   0.2 (mm)

Y=21.4

-1.0   1.0 (%)

M=-1/3.00   F/8.0

-0.2   0.2 (mm)

Y=21.4

-0.2   0.2 (mm)

Y=21.4

-1.0   1.0 (%)

FIG. 5A
SPHERICAL ABERRATION
M=-1/14.00  F/6.2
FIG. 5B
ASTIGMATISM
Y=6.72
FIG. 5C
DISTORTION
Y=6.72
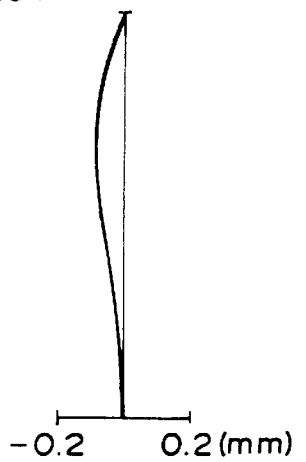
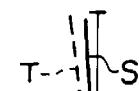
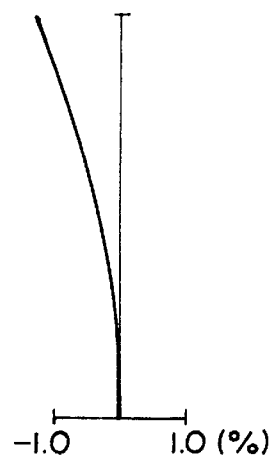
-0.2  0.2 (mm)    -0.2  0.2 (mm)    -1.0  1.0 (%)
FIG. 5D
M=-1/6.66  F/6.9
FIG. 5E
Y=21.4
FIG. 5F
Y=21.4
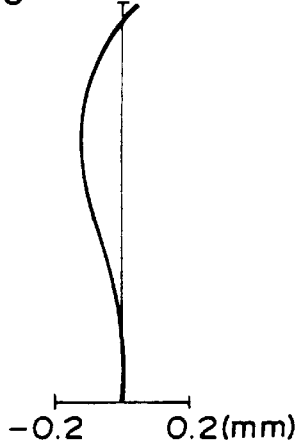
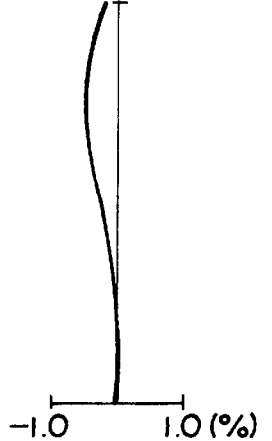
-0.2  0.2 (mm)    -0.2  0.2 (mm)    -1.0  1.0 (%)
FIG. 5G
M=-1/3.00  F/8.0
FIG. 5H
Y=21.4
FIG. 5I
Y=21.4
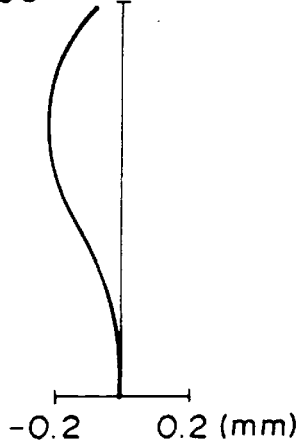
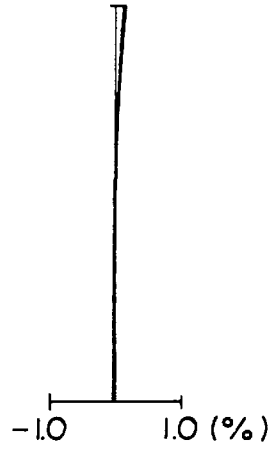
-0.2  0.2 (mm)    -0.2  0.2 (mm)    -1.0  1.0 (%)

ZOOM LENS OPTICAL SYSTEM

BACKGROUND OF THE INVENTION

1. Field of the Invention

This invention relates to a zoom lens optical system to be used for finite distances in a photograph enlarging apparatus, or the like. This invention particularly relates to a zoom lens optical system provided with an optical path splitting means for splitting a light beam, which has passed through a negative film, into light beams following optical paths heading towards a printing section and a photometric section.

2. Description of the Prior Art

Photograph enlarging apparatuses, with which images recorded on negative films supported by negative holders are projected by projecting lenses onto sheets of photographic paper and printed thereon, have heretofore been known. In the photograph enlarging apparatuses, an optical path splitting prism is inserted on the side upstream from a projecting lens (i.e., on the side closer to a negative film than the projecting lens is) in order to split the light beam coming from the negative film into two light beams such that one of the two light beams may travel towards a photometric device.

The systems, wherein an optical path splitting prism is utilized as the optical path splitting means, have advantages over systems, wherein a reflecting mirror is inserted into the optical path only during photometric operations, in that the time required for the optical path splitting means to be moved into and out of the optical path can be eliminated, and therefore the processing speed can be kept high.

A four-set zoom lens has heretofore been known as the projecting lens, which is located on the side downstream from the optical path splitting prism (i.e., on the side closer to a print than the optical path splitting prism is).

Such four-set zoom lenses are disclosed in, for example, Japanese Unexamined Patent Publication Nos. 62(1987)-73222, 1(1989)-142519, and 2(1990)-287414. Each of the disclosed four-set zoom lenses comprises a lens set having a positive refracting power, a lens set having a negative refracting power, a lens set having a positive refracting power, and a lens set having a positive refracting power, which lens sets are located in this order from the side of the plane of image formation.

However, with the disclosed zoom lenses, due to their structures, it is difficult to obtain a long back focal length (i.e., a long distance between the final lens surface and the surface of negative film). For example, the back focal length at the time of the maximum magnification is 56 mm or less. In such cases, because the block-like optical path splitting prism is inserted between the final lens surface and the surface of negative film, the operator cannot easily make visual confirmation of the negative film during the printing operation. Therefore, the working efficiency and accuracy during the printing process cannot be kept high.

SUMMARY OF THE INVENTION

The primary object of the present invention is to provide a zoom lens optical system, wherein a long back focal length is obtained, and therefore the working efficiency and accuracy of an operator are kept high when, for example, the zoom lens optical system is used as a projecting lens optical system in a photograph enlarging apparatus.

Another object of the present invention is to provide a zoom lens optical system, which is compact and has good optical performance.

The present invention provides a zoom lens optical system comprising a first-lens set having a positive refracting power, a second-lens set having a negative refracting power, a third-lens set having a negative refracting power, a fourth-lens set having a positive refracting power, and an optical path splitting means, the first- through fourth-lens set and the optical path splitting means being located in this order from the side of a plane of image formation, wherein the zoom lens optical system satisfies the conditions $$1.2\,fw < f1 < 2.4\,fw \quad (1)$$

$$0.4\,fw < f3/f2 < 0.8\,fw \quad (2)$$

where fw is a number equal to the minimum focal length of the whole system in millimeters, f1 represents the composite focal length of the first-lens set, f2 represents the composite focal length of the second-lens set, and f3 represents the composite focal length of the third-lens set.

The term "optical path splitting means" as used herein means an optical path splitting prism, a semi-transparent mirror, or the like.

The zoom lens optical system in accordance with the present invention is provided with the first-lens set having a positive refracting power, the second-lens set having a negative refracting power, the third-lens set having a negative refracting power, and the fourth-lens set having a positive refracting power, which lenses are located in this order from the side of the plane of image formation. Also, the four sets of the lenses satisfy the conditions $$1.2\,fw < f1 < 2.4\,fw \quad (1)$$

$$0.4\,fw < f3/f2 < 0.8\,fw \quad (2)$$

where fw is a number equal to the minimum focal length in millimeters and f1, f2 and f3 are equal to the corresponding focal lengths in millimeters. In other words, the ratio of f3 to f2 is between 0.4 and 0.8 times fw.

Therefore, with the zoom lens optical system in accordance with the present invention, a long back focal length can be obtained. Also, the zoom lens optical system in accordance with the present invention can have good optical performance and can be kept compact.

Specifically, if the composite focal length f1 of the first-lens set is longer than the upper limit specified in Formula (1), corrections of aberrations can be carried out easily, and the lens configuration of each of the second through fourth-lens set will become simple. However, in such cases, in order for a large variation in the magnification to be achieved, the distance between the second-lens set and the third and fourth-lens sets must be made long. Therefore, the total length of the lens system becomes long, and the size of the lens system cannot be kept small. Accordingly, the need for a compact zoom lens optical system cannot be satisfied.

Conversely, if the composite focal length f1 of the first-lens set is shorter than the lower limit specified in Formula (1), large fluctuations in the aberrations will occur accompanying a change in the magnification, and the optical performance of the zoom lens optical system will become bad.

If the value of f3/f2 is larger than the upper limit specified in Formula (2), the back focal length during the wide angle (W) process will become short, and the deterioration of the curvature of field will become large.

Conversely, if the value of f3/f2 is smaller than the lower limit specified in Formula (2), the back focal length will become long. However, the distortion during the wide angle (W) process will become large, and it will become difficult to carry out corrections of aberrations.

Therefore, when the zoom lens optical system in accordance with the present invention is used as, for example, a projecting lens optical system in a photograph enlarging apparatus, the distance between the lens surface and the surface of negative film can be kept long. Therefore, during the printing work, the operator can easily see the negative film, and the working efficiency and accuracy of the operator can be kept high. Also, the zoom lens optical system in accordance with the present invention can provide good optical performance and good image quality, and can be made compact.

BRIEF DESCRIPTION OF THE DRAWINGS

FIG. 2 is a schematic view showing a photograph enlarging apparatus wherein the embodiment of FIG. 1 is employed, FIGS. 5A–5I are diagrams showing the aberrations of a third embodiment of the zoom lens optical system in accordance with the present invention.

DESCRIPTION OF THE PREFERRED EMBODIMENTS

Figure 1:
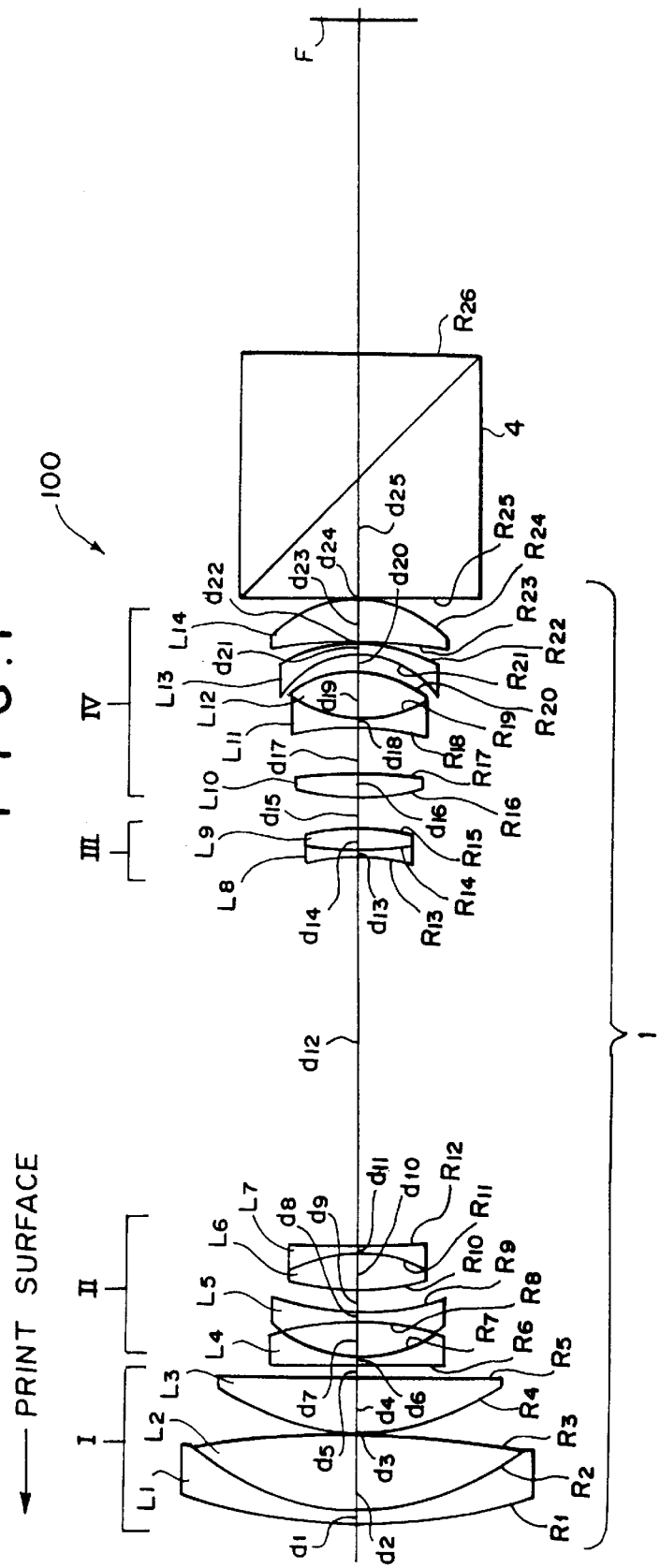
FIG. 1 is a sectional view showing an embodiment of the zoom lens optical system in accordance with the present invention.
Figure 3A:
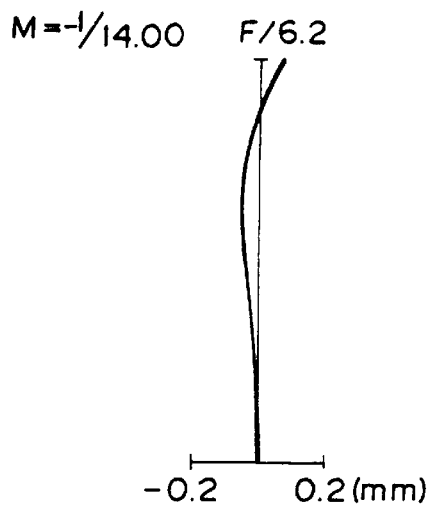
FIGS. 3A–3I are diagrams showing the aberrations of a first embodiment of the zoom lens optical system in accordance with the present invention.
Figure 3B:
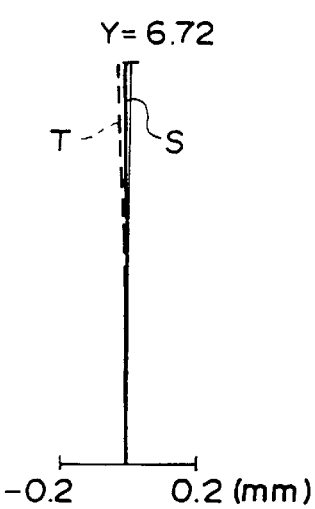
Figure 3C:
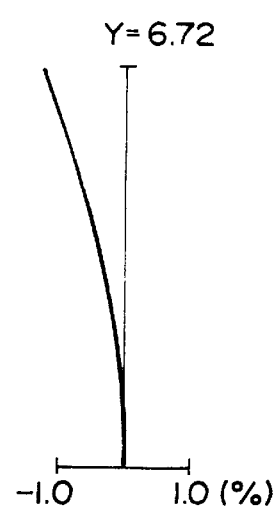
Figure 3D:
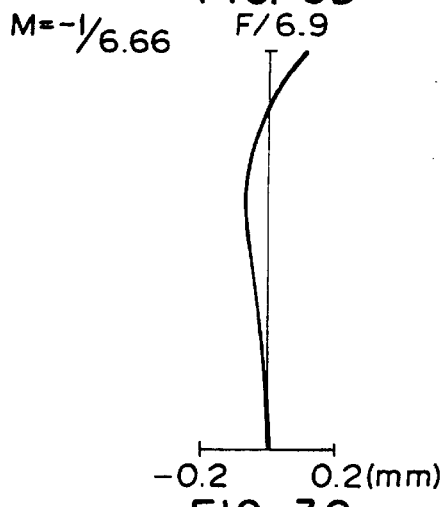
Figure 3E:
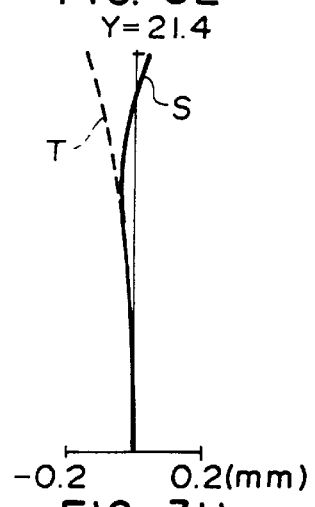
Figure 3F:
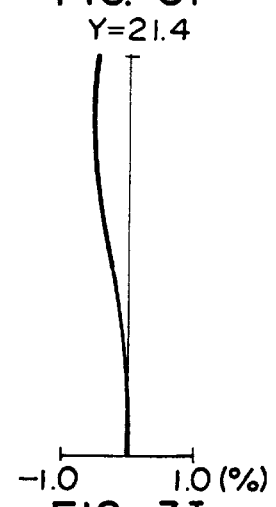
Figure 3G:
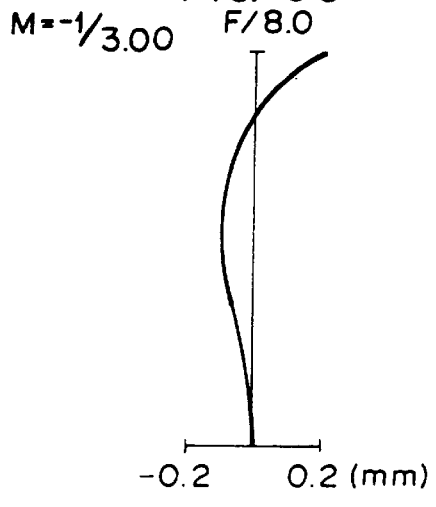
Figure 3H:
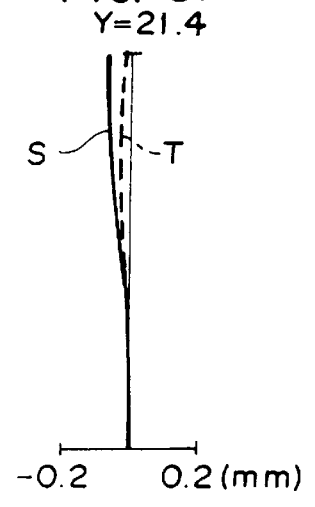
Figure 3I:
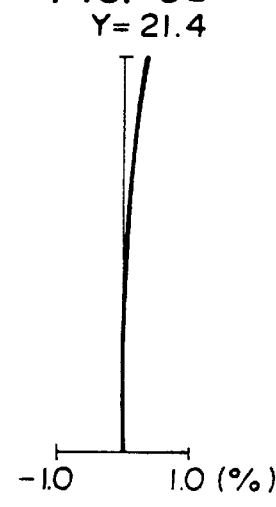
Figure 4A:
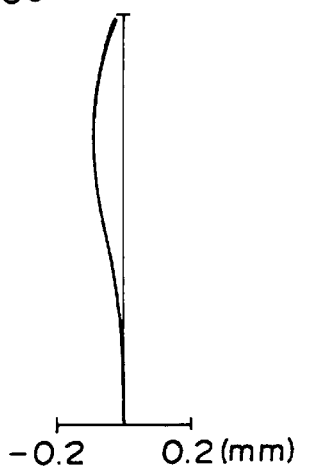
FIGS. 4A–4I are diagrams showing the aberrations of a second embodiment of the zoom lens optical system in accordance with the present invention.
Figure 4B:
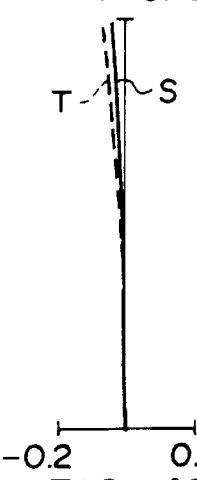
Figure 4C:
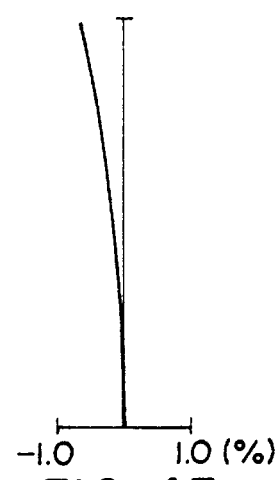
Figure 4D:
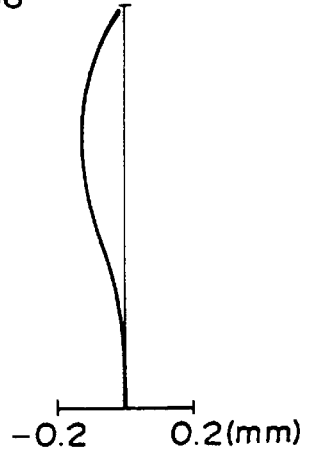
Figure 4E:
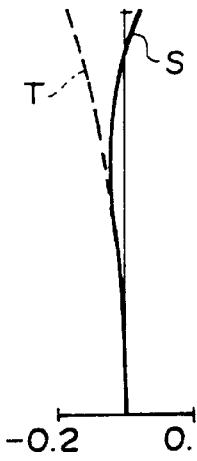
Figure 4F:
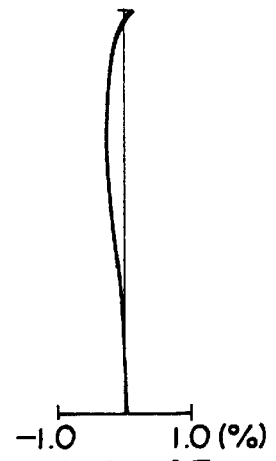
Figure 4G:
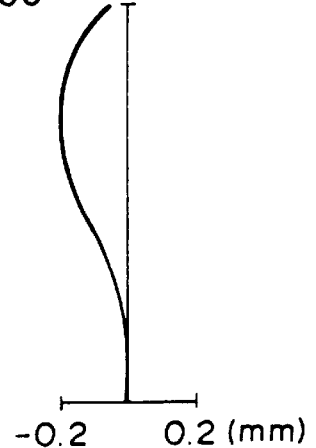
Figure 4H:
Figure 4I:
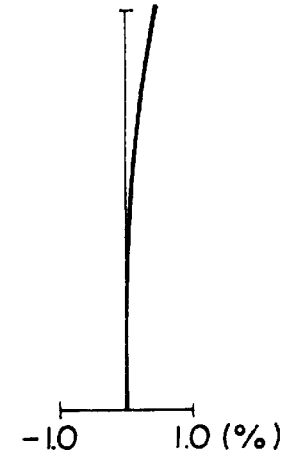

The present invention will hereinbelow be described in further detail with reference to the accompanying drawings.

FIG. 2 schematically shows a photograph enlarging apparatus wherein an embodiment of the zoom lens optical system in accordance with the present invention is employed. With reference to FIG. 2, negative film F is conveyed on a rectangular opening 12 of an exchangeable negative mask 11. A zoom lens 1 or a variable focal length lens 2, which can be exchanged with each other, projects an image having been recorded on the negative film F onto a print C via a reflecting mirror 3. Also, the photograph enlarging apparatus is provided with an optical path splitting prism 4 (a cubic block) and a reflecting mirror 5, which can be exchanged with each other. The optical path splitting prism 4 splits a light beam coming from the negative film F into two light beams such that one of the two light beams may be guided to a photometric system. Alternatively, the reflecting mirror 5 deflects the light beam coming from the negative film F and guides it to the photometric system. The zoom lens 1 and the optical path splitting prism 4 are supported integrally with each other to constitute a zoom lens optical system 100. When the zoom lens optical system 100 is removed and the variable focal length lens 2 is inserted into the optical path, the reflecting mirror 5 is inserted into the optical path and serves as a light deflecting means for guiding the light beam to the photometric system. An image of the light beam, which has been deflected from the projecting optical path by the optical path splitting prism 4 or the reflecting mirror 5, is formed on a photometric device 8 by an image forming lens 6 of the photometric system. Also, part of the light beam, which has been deflected from the projecting optical path by the optical path splitting prism 4 or the reflecting mirror 5, is separated by an optical path splitting prism 7. An image of the thus separated part of the light beam is formed on a light receiving face of an image pickup device 9, which is used for monitoring purposes. An image signal, which has been generated by the image pickup device 9, is fed into a monitor television set 10. An image reproduced on the monitor television set 10 from the image signal is used for adjustment of the image position during the printing process, or the like. The negative mask 11 is provided with the rectangular opening 12 having a size corresponding to the image area size of the negative film F and is exchanged in accordance with the negative film F.

First to third embodiments of the zoom lens optical system 100 in accordance with the present invention will be described hereinbelow with reference to FIG. 1.

The first embodiment of the zoom lens optical system 100 comprises a first-lens set I, a second-lens set II, a third-lens set III, a fourth-lens set IV, and the optical path splitting prism 4, which are located in this order from the side of the plane of image formation (i.e., the surface of the print). The first-lens set I is constituted of three lenses L1, L2, and L3 and has a positive refracting power as a whole. The second-lens set II is constituted of four lenses L4, L5, L6, and L7 and has a negative refracting power as a whole. The third-lens set III is constituted of two lenses L8 and L9 and has a negative refracting power as a whole. The fourth-lens set IV is constituted of five lenses L10 through L14 and has a positive refracting power as a whole. The distances between adjacent ones among the first-lens set I, the second-set lens II, the third-lens set III, and the fourth-set lens IV are variable. Also, the distance between the fourth-set lens IV and the optical path splitting prism 4 is fixed.

The zoom lens optical system 100 satisfies the conditions of Formulas (1) and (2).

$$1.2\ fw < f1 < 2.4\ fw \quad (1)$$

$$0.4\ fw < f3/f2 < 0.8\ fw \quad (2)$$

where fw is a number equal to the minimum focal length of the whole system in millimeters, f1 represents the composite focal length of the first-lens set in millimeters, f2 represents the composite focal length of the second-lens set in millimeters, and f3 represents the composite focal length of the third-lens set in millimeters.

The lens L1 is a negative meniscus lens located such that its convex surface may stand facing the side of the print surface. The lens L2 is a double-convex lens located such that its surface having a larger curvature may stand facing the side of the print surface. The lens L3 is a positive meniscus lens located such that its convex surface may stand facing the side of the print surface. The lens L4 is a negative meniscus lens located such that its convex surface may stand facing the side of the print surface. The lens L5 is a double-concave lens located such that its surface having a larger curvature may stand facing the side of the negative film surface. The lens L6 is a double-convex lens located such that its surface having a larger curvature may stand facing the side of the negative film surface. The lens L7 is a double-concave lens located such that its surface having a larger curvature may stand facing the side of the print surface. The lens L8 is a double-concave lens located such that its surface having a larger curvature may stand facing the side of the print surface. The lens L9 is a double-convex lens located such that its surface having a larger curvature may stand facing the side of the negative film surface. The lens L10 is a double-convex lens located such that its surface having a larger curvature may stand facing the side of the print surface. The lens L11 is a double-concave lens located such that its surface having a larger curvature may stand facing the side of the negative film surface. The lens L12 is a double-convex lens the two surfaces of which have approximately equal curvatures. The lens L13 is a negative meniscus lens located such that its convex surface may stand facing the side of the negative film surface. The lens L14 is a positive meniscus lens located such that its convex surface may stand facing the side of the negative film surface.

In the first embodiment of the zoom lens optical system 100, the magnification of the zoom lens 1 can be changed in the range of −1/14.00 to −1/3.00. Table 1 shows an overall focal length f, a finite back focal length Bf, an F-number FNO, and an image height (negative size) Y for each value of the magnification of the zoom lens 1 in the first embodiment.

TABLE 1

| Magnification M | −1/14.00 | −1/6.66 | −1/3.00 |
|---|---|---|---|
| Focal length f | 34.58 | 73.25 | 132.97 |
| Finite back focal length Bf | 66.76 | 95.33 | 147.73 |
| F-number FNO | 6.2 | 6.9 | 8.0 |
| Image height (negative size) Y | 6.72 | 21.4 | 21.4 |

Table 2 shows the radii of curvature R (mm) of the surfaces of the respective lenses, and the axial thicknesses of the lenses and the axial air separations between the lenses, d (mm), in the first embodiment. Table 2 also shows the refractive indices N of the respective lenses with respect to the d-line, and the Abbe's dispersion numbers ν (νd, this also applies in the descriptions below) of the respective lenses in the first embodiment.

In Table 2, numbers affixed to reference characters R, d, N, and ν represent the order from the side of the print surface.

TABLE 2

| NO | Radius of Curvature R | Axial thickness or axial air separation d | Refractive index N | Abbe's dispersion number ν |
|---|---|---|---|---|
| 1 | 111.017 | 2.50 | 1.78472 | 25.7 |
| 2 | 51.017 | 13.76 | 1.48749 | 70.4 |
| 3 | −210.049 | 0.30 | | |
| 4 | 46.068 | 10.00 | 1.62280 | 56.9 |
| 5 | 1173.864 | (Variable $D_A$) | | |
| 6 | 4601.926 | 1.50 | 1.61800 | 63.4 |
| 7 | 25.209 | 6.65 | | |
| 8 | −60.038 | 1.68 | 1.80235 | 46.7 |
| 9 | 57.765 | 4.08 | | |
| 10 | 51.585 | 6.78 | 1.71736 | 29.5 |
| 11 | −29.352 | 1.25 | 1.80235 | 46.7 |
| 12 | 723.361 | (Variable $D_B$) | | |
| 13 | −35.369 | 1.25 | 1.65016 | 39.3 |
| 14 | 126.739 | 3.75 | 1.71736 | 29.5 |
| 15 | −48.365 | (Variable $D_C$) | | |
| 16 | 44.614 | 4.55 | 1.62588 | 35.6 |
| 17 | −111.616 | 7.88 | | |
| 18 | −57.141 | 1.50 | 1.74950 | 35.0 |
| 19 | 23.161 | 8.75 | 1.49700 | 81.6 |
| 20 | −22.928 | 3.10 | | |
| 21 | −17.279 | 1.63 | 1.80100 | 35.0 |
| 22 | −31.359 | 0.50 | | |
| 23 | −113.996 | 8.00 | 1.54072 | 47.2 |
| 24 | −23.332 | 0.00 | | |

TABLE 2-continued

| NO | Radius of Curvature R | Axial thickness or axial air separation d | Refractive index N | Abbe's dispersion number ν |
|---|---|---|---|---|
| 25 | ∞ | 45.00 | 1.51633 | 64.1 |
| 26 | ∞ | | | |

Focal length f1 of the first-lens set=61.20 mm

Focal length f2 of the second-lens set=−23.24 mm

Focal length f3 of the third-lens set=−455.09 mm

Focal length f4 of the fourth-lens set=60.79 mm

The distances between the respective set lenses I, II, III, and IV are variable. Table 3 shows the distance DA between the first-lens set I and the second-lens set II, the distance DB between the second-lens set II and the third-set lens III, and the distance DC between the third-set lens III and the fourth-set lens IV for each value of the magnification (M).

TABLE 3

| Magnification M | $D_A$ | $D_B$ | $D_C$ |
|---|---|---|---|
| −1/14.00 | 1.398 | 8.879 | 13.981 |
| −1/6.66 | 69.487 | 30.009 | 6.796 |
| −1/3.00 | 6.138 | 4.404 | 1.299 |

A second embodiment of the zoom lens optical system 100 will be described hereinbelow. The structure of the second embodiment is approximately identical with the structure of the first embodiment, except that the lens L4 is a plano-concave lens located such that its plane surface may stand facing the side of the print surface.

Table 4 shows the overall focal length f, the finite back focal length Bf, the F-number FNO, and the image height (negative size) Y for each value of the magnification of the zoom lens 1 in the second embodiment.

TABLE 4

| Magnification M | −1/14.00 | −1/6.66 | −1/3.00 |
|---|---|---|---|
| Focal length f | 34.63 | 73.75 | 133.41 |
| Finite back focal length Bf | 65.50 | 93.04 | 146.20 |
| F-number FNO | 6.2 | 6.9 | 8.0 |
| Image height (negative size) Y | 6.72 | 21.4 | 21.4 |

Table 5 shows the radii of curvature R (mm) of the surfaces of the respective lenses, and the axial thicknesses of the lenses and the axial air separations between the lenses, d (mm), in the second embodiment. Table 5 also shows the refractive indices N of the respective lenses with respect to the d-line, and the Abbe's dispersion numbers ν (νd, this also applies in the descriptions below) of the respective lenses in the second embodiment.

In Table 5, numbers affixed to reference characters R, d, N, and ν represent the order from the side of the print surface.

TABLE 5

| NO | Radius of Curvature R | Axial thickness or axial air separation d | Refractive index N | Abbe's dispersion number vd |
|---|---|---|---|---|
| 1 | 109.054 | 2.50 | 1.78472 | 25.7 |
| 2 | 49.767 | 13.76 | 1.48749 | 70.4 |
| 3 | −196.098 | 0.30 | | |
| 4 | 45.891 | 10.00 | 1.62280 | 56.9 |
| 5 | 2243.591 | (Variable $D_A$) | | |
| 6 | ∞ | 1.50 | 1.61800 | 63.4 |
| 7 | 25.224 | 6.65 | | |
| 8 | −58.166 | 1.68 | 1.80235 | 46.7 |
| 9 | 57.792 | 3.98 | | |
| 10 | 50.437 | 6.78 | 1.71736 | 29.5 |
| 11 | −29.005 | 1.25 | 1.80235 | 46.7 |
| 12 | 572.906 | (Variable $D_B$) | | |
| 13 | −35.852 | 1.25 | 1.65016 | 39.3 |
| 14 | 128.177 | 3.75 | 1.71736 | 29.5 |
| 15 | −47.547 | (Variable $D_C$) | | |
| 16 | 44.451 | 4.55 | 1.62588 | 35.6 |
| 17 | −117.380 | 8.75 | | |
| 18 | −56.552 | 1.50 | 1.74950 | 35.0 |
| 19 | 22.860 | 8.75 | 1.49700 | 81.6 |
| 20 | −22.872 | 3.10 | | |
| 21 | −17.391 | 1.63 | 1.80100 | 35.0 |
| 22 | −32.257 | 0.50 | | |
| 23 | −127.432 | 8.00 | 1.54072 | 47.2 |
| 24 | −23.364 | 0.00 | | |
| 25 | ∞ | 45.00 | 1.51633 | 64.1 |
| 26 | ∞ | | | |

Focal length f1 of the first-lens set=60.45 mm
Focal length f2 of the second-lens set=−22.85 mm
Focal length f3 of the third-lens set=−578.57 mm
Focal length f4 of the fourth-lens set=61.84 mm The distances between the respective set lenses I, II, III, and IV are variable. Table 6 shows the distance DA between the first-lens set I and the second-set lens II, the distance DB between the second-lens set II and the third-lens set III, and the distance DC between the third-lens set III and the fourth-lens set IV for each value of the magnification (M).

TABLE 6

| Magnification M | $D_A$ | $D_B$ | $D_C$ |
|---|---|---|---|
| −1/14.00 | 1.650 | 9.420 | 14.077 |
| −1/6.66 | 69.353 | 30.073 | 6.708 |
| −1/3.00 | 6.627 | 5.409 | 1.973 |

A third embodiment of the zoom lens optical system 100 will be described hereinbelow. The structure of the third embodiment is approximately identical with the structure of the first embodiment.

Table 7 shows the overall focal length f, the finite back focal length Bf, the F-number FNO, and the image height (negative size) Y for each value of the magnification of the zoom lens 1 in the third embodiment.

TABLE 7

| Magnification M | −1/14.00 | −1/6.66 | −1/3.00 |
|---|---|---|---|
| Focal length f | 34.64 | 73.67 | 133.26 |
| Finite back focal length Bf | 65.89 | 93.53 | 146.72 |
| F-number FNO | 6.2 | 6.9 | 8.0 |
| Image height (negative size) Y | 6.72 | 21.4 | 21.4 |

Table 8 shows the radii of curvature R (mm) of the surfaces of the respective lenses, and the axial thicknesses of the lenses and the axial air separations between the lenses, d (mm), in the third embodiment. Table 8 also shows the refractive indices N of the respective lenses with respect to the d-line, and the Abbe's dispersion numbers ν (νd, this also applies in the descriptions below) of the respective lenses in the third embodiment.

In Table 8, numbers affixed to reference characters R, d, N, and ν represent the order from the side of the print surface.

TABLE 8

| NO | Radius of Curvature R | Axial thickness or axial air separation d | Refractive index N | Abbe's dispersion number vd |
|---|---|---|---|---|
| 1 | 111.451 | 2.50 | 1.78472 | 25.7 |
| 2 | 49.202 | 13.76 | 1.48749 | 70.4 |
| 3 | −197.074 | 0.30 | | |
| 4 | 45.479 | 10.00 | 1.62280 | 56.9 |
| 5 | 3204.041 | (Variable $D_A$) | | |
| 6 | 9838.129 | 1.50 | 1.61800 | 63.4 |
| 7 | 25.312 | 6.65 | | |
| 8 | −58.035 | 1.68 | 1.80235 | 46.7 |
| 9 | 58.170 | 3.97 | | |
| 10 | 50.294 | 6.78 | 1.71736 | 29.5 |
| 11 | −29.071 | 1.25 | 1.80235 | 46.7 |
| 12 | 526.807 | (Variable $D_B$) | | |
| 13 | −35.781 | 1.25 | 1.65016 | 39.3 |
| 14 | 127.478 | 3.75 | 1.71736 | 29.5 |
| 15 | −47.741 | (Variable $D_C$) | | |
| 16 | 44.397 | 4.55 | 1.62588 | 35.6 |
| 17 | −117.249 | 8.33 | | |
| 18 | −57.051 | 1.50 | 1.74950 | 35.0 |
| 19 | 22.966 | 8.75 | 1.49700 | 81.6 |
| 20 | −22.893 | 3.10 | | |
| 21 | −17.401 | 1.63 | 1.80100 | 35.0 |
| 22 | −32.212 | 0.50 | | |
| 23 | −125.510 | 8.00 | 1.54072 | 47.2 |
| 24 | −23.408 | 0.00 | | |
| 25 | ∞ | 45.00 | 1.51633 | 64.1 |
| 26 | ∞ | | | |

Focal length f1 of the first-lens set=60.54 mm
Focal length f2 of the second-lens set=−22.91 mm
Focal length f3 of the third-lens set=−548.05 mm
Focal length f4 of the fourth-lens set=61.51 mm The distances between the respective lens sets I, II, III, and IV are variable. Table 9 shows the distance DA between the first-lens set I and the second-set lens II, the distance DB between the second-lens set II and the third-lens set III, and the distance DC between the third-lens set III and the fourth-lens set IV for each value of the magnification (M).

TABLE 9

| Magnification M | $D_A$ | $D_B$ | $D_C$ |
|---|---|---|---|
| −1/14.00 | 1.768 | 9.487 | 14.162 |
| −1/6.66 | 69.324 | 30.033 | 6.672 |
| −1/3.00 | 6.562 | 5.291 | 1.943 |

FIGS. 3A–3I, 4A–4I, and 5A–5I show the aberrations of the first, second, and third embodiments described above. In each of these aberration diagrams, states of each aberration for the three values of the magnification shown in each of the tables shown above are illustrated.

From these aberration diagrams, it is clear that, in every embodiment of the zoom lens optical system 100, good optical performance is kept over the whole variable power range.

Also, as shown in each table shown above, the back focal length Bf, i.e., the distance between the final lens surface and the negative film F, can be kept at 65 mm or longer at the time of a high magnification and can thus be kept at a value sufficiently larger than the value obtained with the conventional technique.

In the embodiments described above, such that large variable power effects can be obtained, the refracting power of the second-lens set II is made larger than the refracting power of each of the other sets of lenses. Also, such that fluctuations in the aberrations may be kept small regardless of the high variable power ratio, both of the second-lens set II and the third-lens set III have the negative refracting power, and the fourth-lens set and the optical path splitting prism are joined with each other.

Also, the third-lens set III and the fourth-lens set IV are moved in the same direction and the distance therebetween is adjusted at a predetermined value when the magnification is changed. Therefore, good effects of correcting the curvature of field and large variable power effects can be obtained.

The structure of the zoom lens optical system in accordance with the present invention is not limited to those of the three embodiments described above. For example, the number of the lenses constituting each lens set, the curvature of each lens, or the like, may be changed. In such cases, the same effects as those of the embodiments described above can be obtained.

For example, in the embodiments described above, the length of the optical path splitting prism 4 (the cubic block), which length is taken in the projecting optical axis direction, is set at 45 mm. This length may be longer or shorter than 45 mm.

However, the length of the optical path splitting prism 4, which length is taken in the projecting optical axis direction, should preferably be longer than 35.0 mm and shorter than 50.0 mm.

If the length of the optical path splitting prism 4, which length is taken in the projecting optical axis direction, is not longer than 35.0 mm, the optical path splitting function cannot be satisfied due to eclipse of the light beam. If the length of the optical path splitting prism 4, which length is taken in the projecting optical axis direction, is not shorter than 50.0 mm, the negative film cannot easily be visually checked by the operator, and it will become difficult to carry out the correction of aberrations.

The zoom lens optical system in accordance with the present invention is particularly useful when it is utilized in photograph enlarging apparatuses. However, the zoom lens optical system in accordance with the present invention is also applicable to any of various other optical apparatuses.

What is claimed is:

1. A zoom lens optical system having a variable magnification comprising a first lens set having a positive refracting power, a second lens set having a negative refracting power, a third lens set having a negative refracting power, a fourth lens set having a positive refracting power, and an optical path splitting means, the first through fourth lens sets and the optical path splitting means being located in the above-stated order from the plane of image formation, wherein the zoom lens optical system satisfies the conditions $$1.2\ fw < f1 < 2.4\ fw \tag{1}$$

$$0.4\ fw/mm < f3/f2 < 0.8\ fw/mm. \tag{2}$$

where fw is a number equal to the minimum focal length of the whole system in millimeters, f1 is a number equal to the composite focal length of the first lens set in millimeters, f2 is a number equal to the composite focal length of the second lens set in millimeters, and f3 is a number equal to the composite focal length of the third lens set in millimeters.

2. A zoom lens optical system as defined in claim 1 wherein the refracting power of the second-lens set is larger than the refracting power of each of the other lens sets.

3. A zoom lens optical system as defined in claim 1 wherein the distances between adjacent lens sets among the first-lens set, the second-lens set, the third-lens set, and the fourth-lens set are variable, and the distance between the fourth-lens set and the optical path splitting means is fixed.

4. A zoom lens optical system as defined in claim 1 wherein the third-lens set and the fourth-lens set are moved in the same direction, and the distance therebetween is varied when the magnification is varied.

5. A zoom lens optical system as defined in claim 1 wherein the optical path splitting means is an optical path splitting prism.

* * * * *